July 3, 1956 W. D. PALMER 2,753,195
SELF-SEALING COUPLING
Filed July 14, 1953 5 Sheets-Sheet 1

INVENTOR.
William D. Palmer

July 3, 1956

W. D. PALMER 2,753,195

SELF-SEALING COUPLING

Filed July 14, 1953

INVENTOR.
William D. Palmer

July 3, 1956 W. D. PALMER 2,753,195
SELF-SEALING COUPLING
Filed July 14, 1953 5 Sheets-Sheet 4

INVENTOR.
William D. Palmer

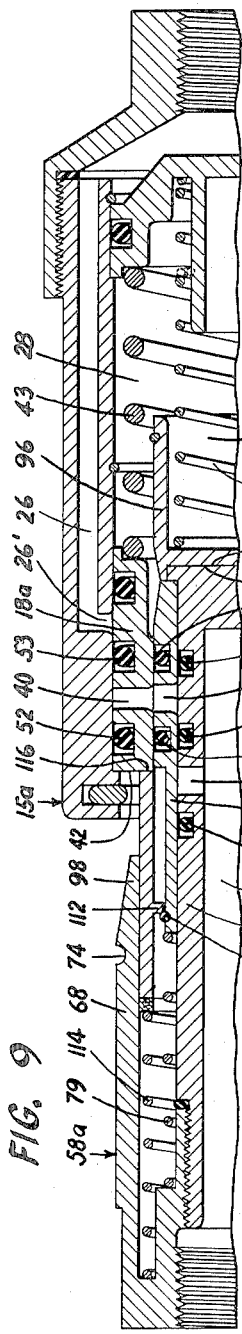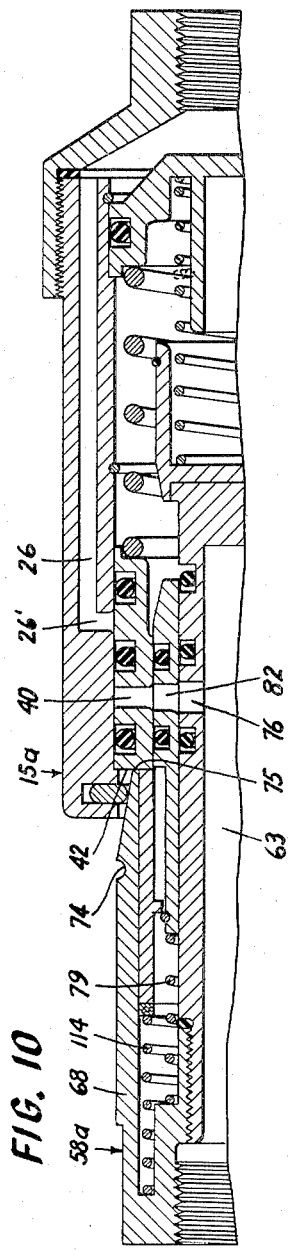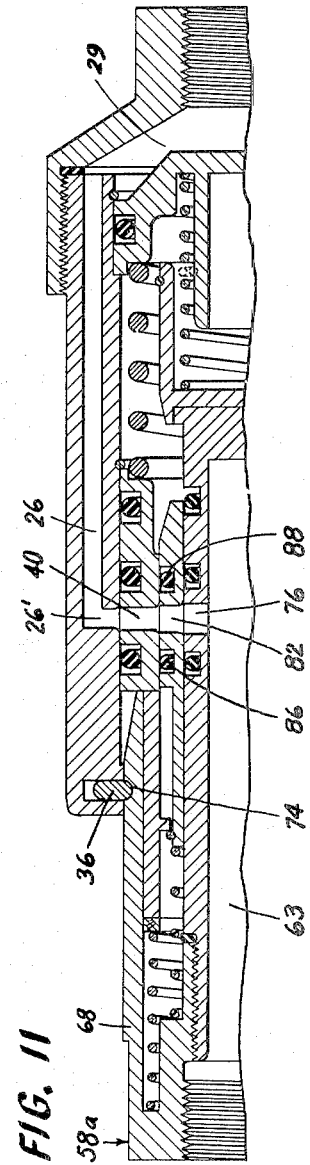

United States Patent Office 2,753,195
Patented July 3, 1956

2,753,195
SELF-SEALING COUPLING

William D. Palmer, Glen Ridge, N. J.

Application July 14, 1953, Serial No. 367,899

12 Claims. (Cl. 284—18)

This invention relates to couplings and, more particularly, to self-sealing couplings for pipes or hoses.

Self-sealing couplings may be broadly defined as couplings adapted for connecting fluid carrying pipes, which couplings when connected serve to join the ends of the pipes while automatically permitting the flow of fluid from one pipe to the other, i. e., through the coupling. Conversely, when the coupling is disconnected, the flow of fluid is automatically sealed or stopped off, and the two ends of the pipes are disconnected.

Heretofore self-sealing couplings have been designed to automatically seal when uncoupled and to automatically open when coupled to permit the flow of fluid. Some of these couplings are designed to couple manually against low pressures while others require a wrench or similar mechanism to facilitate coupling and uncoupling. There are many applications where it is desirable to manually couple and uncouple, without the aid of a wrench, against pressures ranging up to 1500 p. s. i. and over. Therefore, it is the principal object of my invention to provide a self-sealing coupling which may be manually coupled and uncoupled against high pressures without the aid of a wrench or similar mechanism.

A further object of my invention is to provide a manually operable self-sealing coupling to connect two pipe sections, either or both of which pipe sections may be under pressure, wherein the connecting self-sealing coupling will automatically permit the flow of fluid from one of the pipe sections to the other pipe section upon coupling.

Yet another object of the invention is to provide a self-sealing coupling which may be coupled and uncoupled with substantially no loss of fluid on uncoupling or inclusion of air on coupling.

The aforesaid objects, and other objects which will become apparent as the description proceeds, are achieved by the provision of a self-sealing coupling in which all coupling parts are completely balanced with respect to the pressures against which the joint is made, so that manual coupling and uncoupling against very high pressures is possible.

For a better understanding of the invention, reference should be had to the accompanying drawings, like numerals of reference referring to like parts, wherein:

Fig. 9, Fig. 10 and Fig. 11 are similar views to Fig. 5, Fig. 6 and Fig. 7, showing the alternative embodiment of the invention in successive positions during the coupling operation.

Figure 1:
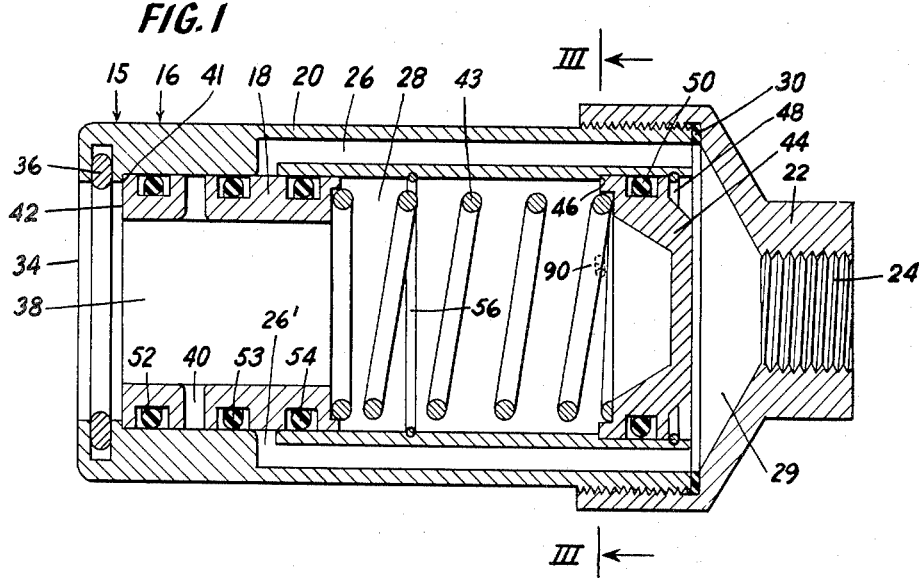
Fig. 1 and Fig. 2 are vertical sections through the two parts of a self-sealing coupling embodying one form of this invention, the coupling sections being shown separated.
Figure 2:
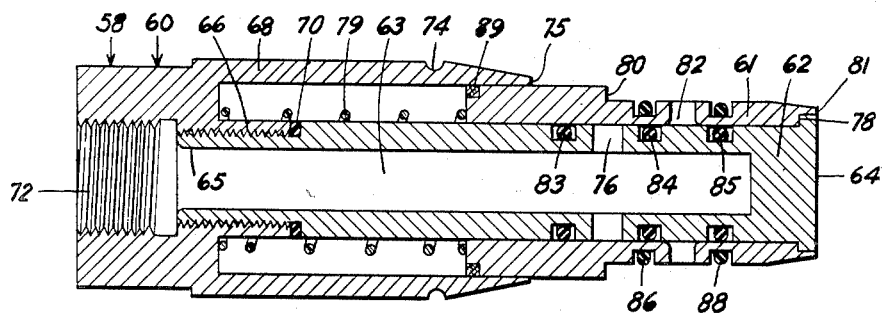

Although the principles of the invention are broadly applicable to any application wherein a completely balanced valve system is required, the invention is usually employed in conjunction with a self-sealing coupling, and hence it has been so illustrated and will be so described.

With specific reference to the form of the invention illustrated in the drawings, the numeral 15 indicates one coupling part which comprises generally a housing 16 and a tubular piston valve 18 slidable therein. The housing 16 comprises a hollow passageway portion 20 and a housing pipe adaptor 22 which is threaded onto the passageway portion 20. The housing pipe adaptor 22 is tapered to provide a fluid conduit and carries female pipe threads 24 for connection with a fluid carrying pipe (not shown). The passageway portion 20 is provided with a plurality of double-ended longitudinal passageways 26 terminating at one end in transverse ports 26' opening into the socket 28 formed by the inner surface of the hollow passageway portion 20, and at the other end at the fluid conduit 29 formed in part by the housing passageway portion 20 and the tapering portion of the housing pipe adaptor 22. Between the passageway portion 20 and the adaptor portion 22 is a circumferential packing 30 to provide a fluid tight seal.

Carried within the housing passageway portion 20 and near the open end 34 of socket 28 is a coupling retaining means 36, which may take the form of a manually operable snap spring arrangement, as shown, and which operates to hold the two coupling parts together in coupling position, as hereinafter explained.

Slidably mounted within socket 28 is the tubular piston valve 18 which has the general configuration of a hollow open-ended cylinder, the inner surface or bore 38 of said tubular piston valve being adapted to receive the other coupling part. There is provided through the wall of said tubular piston valve a plurality of transverse ports 40 which serve to connect with the transverse passageways 26' in the coupled position, as hereinafter explained. The housing passageway portion 20 carries a tubular piston valve retaining ledge 41 near the retaining means 36 against which end 42 of tubular piston valve 18 abuts in the normal or uncoupled position. The tubular piston valve is normally maintained in this abutting position by tubular piston valve spring 43, one end of which contacts tubular piston valve 18 and the other end of which abuts against socket closure disc 44 which is located within socket 28 at the opposite end of passageway portion 20 from the open socket end 34. This socket closure disc with housing pipe adaptor 22 and housing passageway portion 20 forms fluid conduit 29, and the closure disc is maintained rigid within the socket by a disc retaining ledge 46 in socket 28 and disc snap ring 48 which are spaced on either side of the disc to firmly secure it in place within the socket. Disc 44 necessarily carries a circumferentially disposed disc sealing means 50 to prevent fluid access from the fluid conduit 29 into the socket 28.

Tubular piston valve 18 carries a plurality of circumferentially disposed sealing means 52, 53 and 54 which in the normal or uncoupled position are located on either side of the ends of the housing passageway 26' which open into the socket 28, and on either side of the transverse ports 40. These sealing means 52, 53 and 54 serve to seal off the fluid in passageways 26' in the uncoupled position.

The passageway portion 20 of housing 16 also carries a tubular piston valve longitudinal motion limiting means 56, which may take the form of a snap ring, on its inner or socket surface 28, in order to limit the longitudinal motion of the tubular piston valve 18 in the coupled position, as hereinafter explained.

The other coupling part 58 comprises generally a body portion 60 having a sleeve valve 61 slidable thereon. The body portion comprises a body tubular portion 62 having a longitudinal passageway 63 therethrough of which one end 64 is closed, the other end 65 carrying external threads 66 which cooperate in attaching a pipe adapting and enclosing hollow cylinder 68 to form the body portion 60. Between the pipe adaptor 68 and body tubular portion 62 is a circumferential fluid sealing packing 70 for sealing the fluid within the fluid passageway of the tubular body portion 62. The pipe adapting and body enclosing cylinder 68 carries female threads 72 for connection to a fluid carrying pipe (not shown).

Carried intermediate the ends of and on the exterior surface of body enclosing cylinder 68 is an exterior detent 74 which cooperates with retaining means 36 to hold the parts 15 and 58 in coupling position, as hereinafter explained. Enclosing cylinder 68 is beveled near the end 75 opposite the pipe adapting threads 72 to facilitate operation of the retaining means 36 during the coupling operation.

A plurality of body radial ports 76 are circumferentially disposed through the tubular portion 62 between the axial passageway 63 and the outer wall of said tubular portion and intermediate the ends thereof. The sleeve valve 61 which is slidable on said tubular portion 62 serves to seal or stop off the body radial ports 76 in the normal or uncoupled position. There is provided on tubular portion 62 near its closed end 64 a sleeve valve retaining ledge 78 against which sleeve valve 61 is normally urged by a sleeve valve resilient means or spring 79.

The sleeve valve 61 has the general configurations of a hollow cylinder carrying an embossment 80 on its exterior surface intermediate its ends, which embossment cooperates with the other coupling part to control the telescoping of the two parts during coupling as hereinafter explained. In addition, the sleeve valve 61 is beveled at its end 81 nearest retaining ledge 78 to facilitate insertion of the sleeve valve into the tubular piston valve bore 38 during coupling, as hereinafter explained.

A plurality of sleeve valve radial ports 82 are circumferentially disposed through sleeve valve 61. Carried on the body tubular portion 62 are a plurality of circumferentially disposed sealing means 83, 84 and 85 for sealing the clearance between sleeve valve 61 and body tubular portion 62. In the normal or uncoupled position, these plural sealing means form a fluid seal on either side of said body ports 76 and on either side of said sleeve valve radial ports 82. The sleeve valve 61 carries on its exterior surface and on either side of sleeve valve radial ports 82, circumferentially disposed sealing means 86 and 88 which in the coupled position seal the clearance between the inner surface of tubular piston valve 18 and the outer surface of sleeve valve 61.

A loose fitting packing 89, which may be of leather, may be carried by the sleeve valve 61 to prevent access of dirt. This packing, however, is sufficiently loose to permit the ingress and egress of air during uncoupling and coupling.

Figure 3:
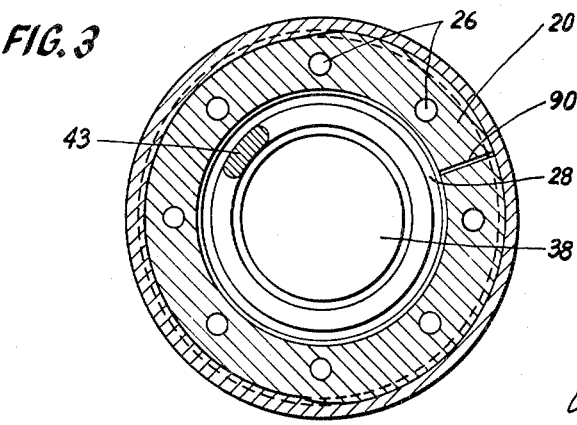
Fig. 3 is a vertical section taken along the lines III—III of Fig. 1, in the direction of the arrows.

It is necessary to provide the coupling part 15 with a bleed port 90 connecting the socket 28 with the outer surface of the passageway portion 20 in order to permit the egress and ingress of air to the socket during the coupling and uncoupling operation. This bleed port, as shown, opens into a threaded section, but standard pipe threads will in no measurable way impede the flow of air, and this serves to keep the bleed port free from dirt and contamination. This bleed port is shown in Fig. 3.

Figure 4:
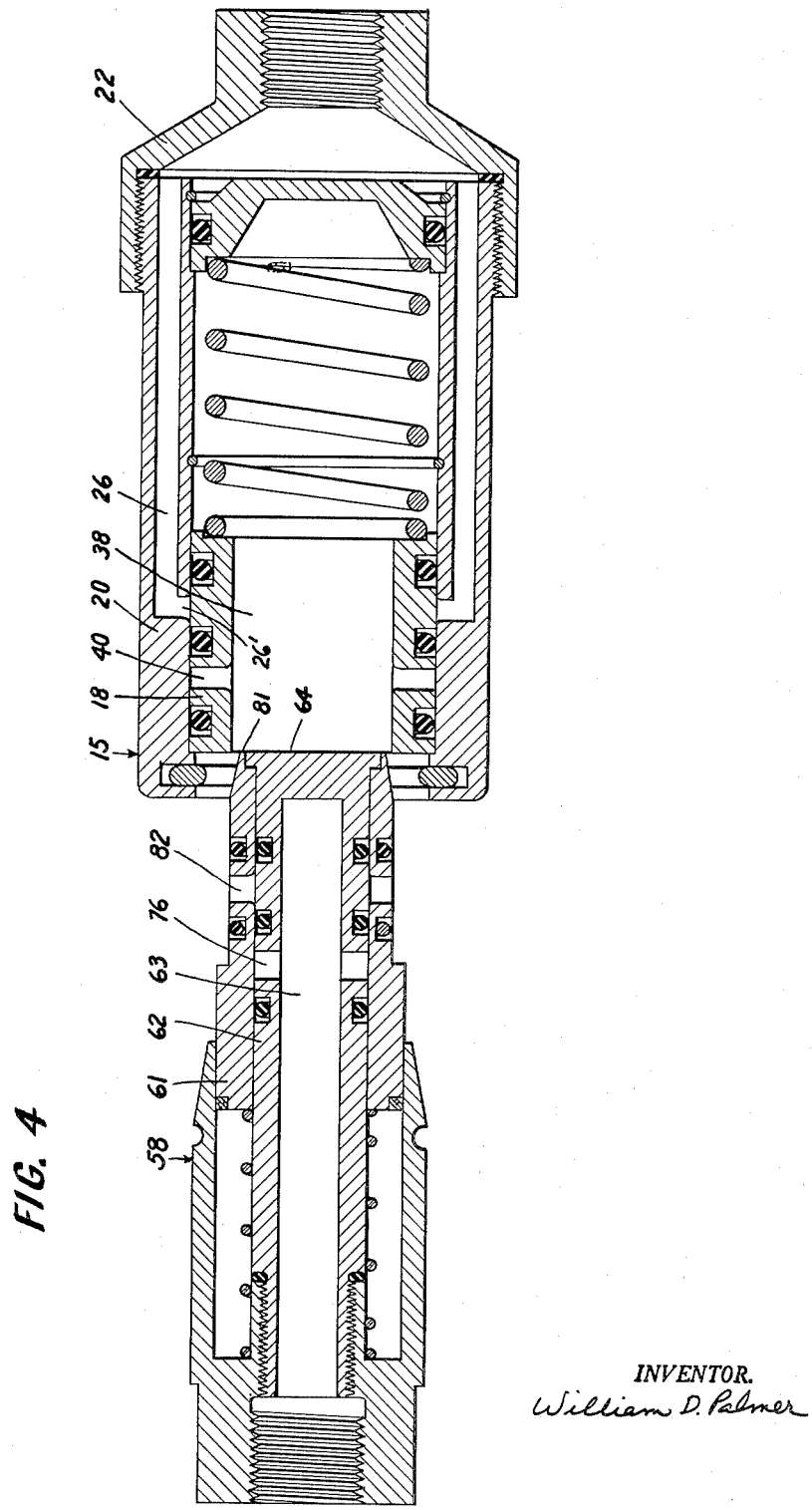
Fig. 4 is a vertical section through the two parts of the coupling as shown in Fig. 1 and Fig. 2, with the parts in abutting relationship.

There are shown in Fig. 4 the two coupling parts 15 and 58 in abutting relationship, which represents the first step of the coupling operation. As shown, the closed end 64 of body tubular portions 62 is adjacent to the bore 38 of the tubular piston valve 18.

Figure 5:
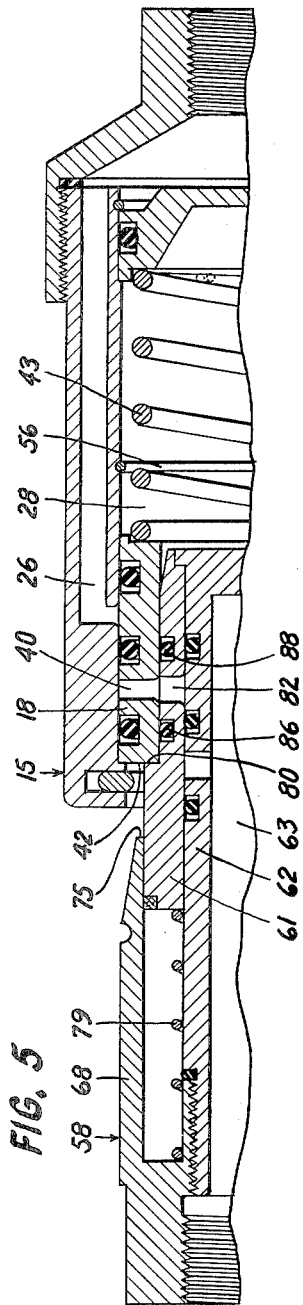
Fig. 5 is a sectional view through the upper halves of the two coupling parts showing the relative position of the internal portions of the coupling parts during one state of the coupling operation.
Figure 6:
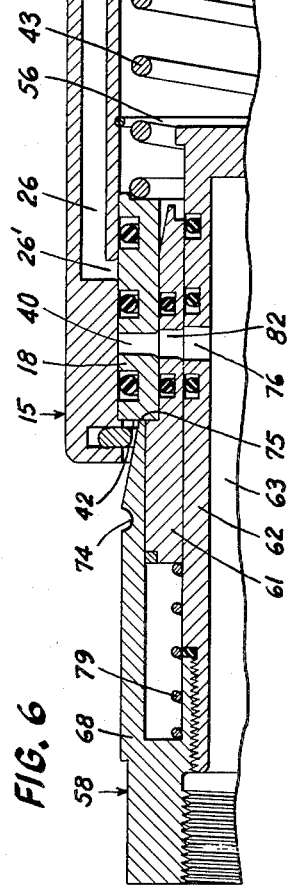
Fig. 6 is a similar view to Fig. 5 showing a further step during the coupling operation.
Figure 7:
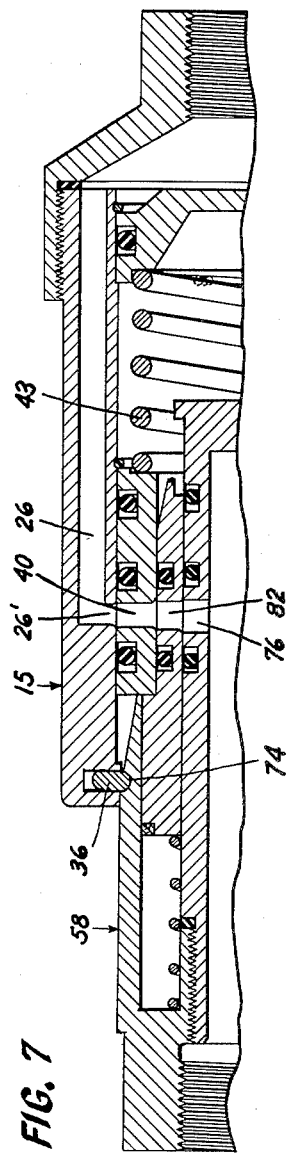
Fig. 7 is a similar view to Fig. 5 showing the two coupling parts in coupled position.

In Figs. 5, 6 and 7 are represented the two coupling parts 15 and 58 in various stages of the coupling operation. On gradual telescoping of the two coupling parts 15 and 58 the axial motion is unimpeded until the end 42 of tubular piston valve 18 contacts the sleeve valve embossment, as shown in Fig. 5. At this stage of the coupling operation, the sealing means 86 and 88 seal the clearance between tubular piston valve 18 and sleeve valve 61. It is obvious that from this point on in the coupling operation, the two coupling parts are completely balanced with respect to the pressures carried within the pipes to be connected, and if any of the fluid contained within the longitudinal passageways 26 and/or 63 escapes into the radial ports 40 and 82, there will be no axial pressures tending to force the coupling halves 15 and 58 either together or apart. From this point on in the coupling operation, it is immaterial how the internal parts of the coupling move with respect to one another in effecting final coupling.

In the embodiment as illustrated in Figs. 1 through 7, tubular piston valve spring 43 has been made stronger than sleeve valve spring 79. Consequently, when the coupling parts are further telescoped, as shown in Fig. 6, sleeve valve spring 79 is overcome and sleeve valve 61 is forced back over tubular body portion 62 until the leading edge 42 of tubular piston valve 18 contacts the beveled edge 75 of the body enclosing cylinder 68. At this point the fluid in fluid passageway 63 has access to radial ports 40 and 82, but since there is no unbalance of the coupling parts the high pressure fluid exerts no axial forces on the coupling parts. It should be noted that if the sleeve valve spring 79 were stronger than the tubular piston valve spring 43, the tubular piston valve spring would be overcome first and the tubular piston valve would be forced back within the socket 28 until the tubular piston valve contacted limiting means 56. This would in no way affect the operation of the coupling.

Further axial telescoping of the coupling parts toward coupling position will overcome the tubular piston valve spring 43, as shown in Fig. 7, and the retaining means 36 is forced over the beveled portions of the body 60 until the retaining means 36 snaps into the detent 74, to lock the coupling parts 15 and 58 in coupled position. In this coupled position, the radial ports or passageways 26', 40, 82 and 76 are all in substantial alignment or registry and the fluid in the pipes has access from one pipe to the other. It is obvious that there are no axial forces, other than spring pressures, tending to separate the coupling halves, and the retaining means 36 may take the form of any simple snap mechanism which may be relatively flimsy in nature and which may be easily manually engaged and disengaged.

In uncoupling the two parts, the foregoing procedure is reversed, and during the uncoupling operation, the two parts are completely balanced at all times, no matter on which pipe is carried a static or dynamic pressure.

In some applications, such as hydraulic systems, it is often desirable to be able to couple and uncouple without substantial loss of fluid on uncoupling or inclusion of air on coupling. In the embodiment illustrated in Figs. 1 through 7 the fluid entrapped in the radial ports 40 and 82 will be lost on uncoupling and an equivalent amount of air will be included on coupling. To overcome this possible objection, there is illustrated in Figs. 8, 9, 10 and 11 a modification of my invention wherein a supplementary plug 96 and tubular sealing member 98 are provided to enable the joint to be made without substantial loss of fluid or inclusion of air on uncoupling and coupling.

As in the preferred embodiment, the modification is comprised of two coupling parts 15a and 58a, each of which parts corresponds to the preferred embodiment except for the plug 96 and sealing member 98, with but minor changes in the structure of some parts.

Figure 8:
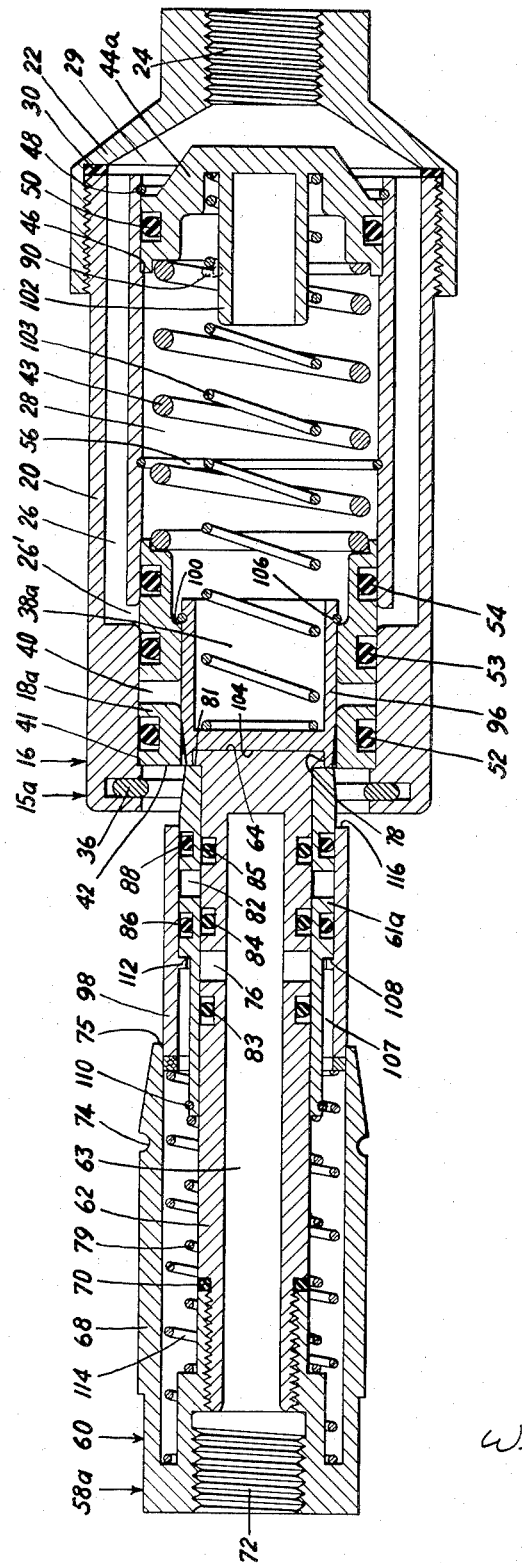
Fig. 8 is a similar view to Fig. 4 showing an alternative embodiment of the invention.

Fig. 8 shows the two parts 15a and 58a in abutting position, corresponding to Fig. 4. One part 15a comprises a housing 16, tubular piston valve 18a, hollow passageway portion 20, housing pipe adaptor 22, female threads 24, longitudinal passageways 26, transverse passageways 26', socket 28, fluid conduit 29, packing 30, retaining means 36, tubular piston valve bore 38a, tubular piston valve ports 40, tubular piston valve retaining ledge 41, tubular piston valve end 42, tubular piston valve spring 43, socket closure disc 44a, disc retaining ledge 46, disc snap ring 48, disc sealing means 50, sealing means 52, 53 and 54, tubular piston valve longitudinal motion limiting means 56 and bleed port 90.

The tubular piston valve 18a is slightly modified to include a plug retaining ledge 100 located on the inner surface of tubular piston valve 18a, which limits the longitudinal motion of the plug 96 with respect to the tubular piston valve 18a. The socket closure disc 44a is slightly modified to include a plug spring guide 102 for guiding and retaining the plug spring 103 in the coupling operation.

The plug 96 has the configuration of a hollow cylinder, closed at the end 104 opposite the pipe adaptor 22 and is adapted to slidably fit within the tubular piston valve bore 38a. This plug serves to seal the ports 40, in the uncoupled position, against loss of fluid and inclusion of air, and to prevent the entry of foreign matter into the socket 28. The plug outer surface may carry a sealing material, if desired, or a sealing means may be provided between the plug 96 and the bore 38a to better seal the fluid in ports 40. However, since the plug will not have to seal against pressures, the seal between the outer surface of the plug 96 and the bore 38a may merely consist, if desired, of a carefully machined fit, as illustrated. The outer cylindrical surface of the plug near the closed end 104 is beveled, to facilitate the insertion of the plug into the bore 38a on uncoupling.

A plug limiting stop 106 comprises a circumferential snap ring carried on the outer surface of the plug 96, which limiting stop cooperates with the plug retaining ledge 100 in limiting longitudinal motion of the plug with respect to the tubular piston valve 18a, and confining the plug within the limit of the bore 38a.

The plug 96 is normally urged against said retaining ledge 100 by the plug spring 103, one end of which abuts against closed end 104 of the plug and the other end of which abuts against socket closure disc 44a. The socket closure disc differs from the corresponding member in the preferred embodiment with respect to the plug spring guide 102, but the disc snap ring 48 and disc sealing means 50 are as illustrated in the preferred embodiment.

The other coupling part 58a comprises a body portion 60, sleeve valve 61a, body tubular portion 62, axial passageway 63, tubular portion closed end 64, pipe adapting and enclosing cylinder 68, packing 70, female threads 72, detent 74, enclosing cylinder end 75, body radial ports 76, sleeve valve retaining ledge 78, sleeve valve spring 79, sleeve valve end 81, sleeve valve ports 82, body sealing means 83, 84 and 85, and sleeve valve sealing means 86 and 88. The sleeve valve 61a is slightly modified to include a recessed portion 107 adapted to receive a tubular sealing member 98 longitudinal motion limiting means. One end of the sleeve valve recessed portion 107 is defined by a limiting stop ledge 108, and the other end is defined by a limiting stop snap ring 110.

The tubular sealing member 98 has the configuration of a hollow cylindrical body with an embossment 112 on its inner surface for cooperating with the sleeve valve recessed portion 107 and limiting stops 108 and 110 for limiting the axial motion of the tubular sealing member 98 with respect to the sleeve valve 61a. This embossment 112 is normally maintained against and urged against the sleeve valve limiting ledge 108 by a tubular sealing member spring 114 which abuts against the tubular sealing member 98 and the body enclosing cylinder 68, which cylinder may be modified slightly, if desired, to allow the tubular member spring 114 to be slightly longer to improve coupling operation. Tubular member 98 is preferably maintained entirely inwardly from closed end 64. The end 116 of the tubular sealing member 98 located opposite the abutting tubular member spring 114 is adapted to contact the end 42 of tubular piston valve 18a during coupling, as hereinafter explained.

On first telescoping of the coupling parts toward coupling position, the closed end 64 of tubular portion 62 contacts the closed end 104 of the plug 96, which overcomes plug spring 103 and forces the plug 96 back into the socket 28. On further telescoping, the end 116 of tubular sealing member 98 contacts the end 42 of tubular piston valve 18a, overcoming tubular member spring 114 and forcing the tubular sealing member 98 back over the sleeve valve 61a. As illustrated in Fig. 9 the tubular sealing member spring 114 and the plug spring 103 have both been overcome during the telescoping of the two coupling parts, while the sleeve valve spring 79 and the tubular piston valve spring 43 have not yet been overcome. It is important that both the tubular piston valve spring 43 and sleeve valve spring 79 be of sufficient strength with respect to the tubular sealing member and plug springs that the seal between the ports 40 and 82 be effected by sealing means 86 and 88 before the seals made by sealing means 84 and 53 between the ports 82 and 40 and the corresponding passageways 63 and 26 are broken.

Considering the two parts separately in Fig. 9, the plug member 96 has been forced back within the bore 38a of tubular piston valve 18a. In the other coupling part 58a, the tubular sealing member 98 has been forced back with respect to the sleeve valve 61a until the tubular member embossment 112 contacts the snap ring 110 on sleeve valve 61a, which contact limits further relative movement between the tubular member 98 and the sleeve valve 61a. In this position the ports 40 and 82 register, and as in the preferred embodiment, any further motion of the parts toward coupling position is not important as far as effecting sealing is concerned, for once the seal has been effected on either side of the ports 40 and 82 by sealing means 86 and 88, the two coupling parts will always be perfectly balanced with respect to the internal fluid pressures.

In Fig. 10, in the embodiment as shown, a further telescoping of the parts toward coupling position overcomes sleeve valve spring 79 and the parts 15a rides over, or telescopes onto, part 58a until contact is made between the end 42 of tubular piston valve 18a and the beveled end 75 of body portion 68, at which time the ports 40, 76 and 82 all register.

Still further telescoping of the coupling parts toward coupling position will cause the retaining means 36 to ride over the beveled portion of body portion 68 and lock into the detent 74, thus locking the coupling parts in coupling position. In this coupled position, as shown in Fig. 11, the ports 26', 40, 82 and 76 are all in registry, and the fluid may flow freely from one pipe to the other, the flow being through the passageway 63, through the registered ports, through the longitudinal passageways 26, through the fluid conduit 29 and thence to the other pipe. Of course, the direction of fluid flow may be reversed, if desired, since the coupling is not sensitive to which pipe is carrying the higher pressure, due to the complete balance of the coupling internal parts with respect to the fluid pressure.

In uncoupling the procedure is reversed, and the coupling parts are at all times in complete balance. On the final separation of the parts, the plug closes off the fluid in ports 40, and the tubular sealing member 98 cooperates with sealing means 86 and 88 to seal off the fluid in ports 82. Of course the ports 82 are under pressure when the joined ends 116 and 42 of tubular sealing member 98 and tubular piston valve 18a pass over these ports during uncoupling, and sufficient fluid will seep through these jointures to relieve the pressure, but since these pressures are static the amount of fluid lost will be inconsequential. The same is true when the joined ends 104 and 81 of plug 96 and sleeve valve 61a pass over ports 40, but at this stage in the uncoupling operation, all pressure in the ports 40 is static and substantially no fluid is lost in relieving the static pressure in these ports.

When telescoping the two coupling parts during the coupling operation, the orientation of one coupling part with respect to the other coupling part might vary slightly, with respect to rotation of one part relative to the other, from one coupling operation to the next, thus affecting the orientation of the various coupling radial ports with respect to one another. In order to insure adequate flow through the coupling parts, the radial ports may be located sufficiently close together to insure adequate flow of fluid through the coupling, independent of the orientation of the two parts. Alternatively, small guide grooves (not shown) may be provided to insure that all radial ports will properly register on coupling.

In the embodiments as illustrated and described, all packings, except the loose fitting packing 89 and the stationary packings or sealing means, are of the O ring type. Many different types of resilient commercially available sealing means may be substituted for the O ring packings, if desired, as is well known in the art.

As a possible alternative embodiment of the invention, the coupling may be used in pneumatic systems, and to connect gas carrying lines. For such an application it would be necessary to provide all sealing means with an oil backing washer, or to use sealing means not requiring fluid lubrication, but such sealing methods are well known in the art.

It will be recognized that the objects of the invention have been achieved by providing a self-sealing coupling which may be manually coupled against very high pressures, which pressures may exist in either and/or both of the pipe sections being coupled. In addition, a slightly modified coupling has been provided which may be operated in substantially the same manner as the preferred embodiment, but substantially without loss of fluid on uncoupling or inclusion of air on coupling.

While in accordance with the patent statutes one best known embodiment of the invention has been illustrated and described in detail, it is to be particularly understood that the invention is not limited thereto or thereby.

This constitutes a continuation in part of application Serial Number 152,632, covering a Self-Sealing Coupling, which was filed under date of March 29, 1950, now abandoned.

I claim:

1. A separable self-sealing fluid coupling comprising two telescopically interfitting parts adapted for coupled and uncoupled positions, one of said parts comprising a housing provided with a socket and a fluid passageway terminating in a transverse port open at said socket intermediate the ends thereof, a tubular piston valve slidable in said housing socket and provided with a bore and a transverse port intermediate the ends thereof, said tubular piston valve transverse port registering with said housing socket in said uncoupled position and with said housing port in said coupled position, the other of said parts comprising a body having a closed outer end and a fluid passageway therein terminating in a radial port through the wall of said body, a sleeve valve slidable on said body and telescopically fitting into said tubular piston valve bore, said sleeve valve being provided with a radial port registering with the wall of said body in said uncoupled position and with said body radial port in said coupled position, and said sleeve valve port registering with said tubular piston valve port in said coupled position.

2. A separable self-sealing fluid coupling as specified in claim 1 wherein a snap mechanism carried on one of said parts and a detent is carried on the other of said parts releasably holding said coupling parts in said coupled position, and said snap mechanism being manually operable.

3. A separable self-sealing fluid coupling as specified in claim 1 wherein a tubular piston valve spring urges said tubular piston valve toward a position of registering relationship between said tubular piston valve port and said socket, and a sleeve valve spring urges said sleeve valve toward a position of registering relationship between said sleeve valve port and the wall of said body.

4. A separable self-sealing fluid coupling as specified in claim 3 wherein a tubular piston valve stop is carried by said housing and a sleeve valve stop is carried by said body, said tubular piston valve being urged by said tubular piston valve spring toward abutment against said tubular piston valve stop, and said sleeve valve being urged by said sleeve valve spring toward abutment against said sleeve valve stop.

5. A separable self-sealing fluid coupling as specified in claim 3 wherein sealing means are provided on opposite sides of said body radial port between said sleeve valve and the wall of said body when said sleeve valve port registers with the wall of said body, and additional sealing means are provided on opposite sides of said housing transverse port between said tubular piston valve and said housing socket when said tubular piston valve port registers with said socket.

6. A separable self-sealing fluid coupling as specified in claim 3 wherein sealing means are provided on opposite sides of said body port and said sleeve valve port between said sleeve valve and the wall of said body when said sleeve valve port registers with said body port, further sealing means are provided on opposite sides of said housing port and said tubular piston valve port between said tubular piston valve and said housing socket when said housing port registers with said tubular piston valve port, and additional sealing means are provided on opposite sides of said sleeve valve port and said tubular piston valve port between said sleeve valve and said tubular piston valve when said tubular piston valve port registers with said sleeve valve port.

7. A separable self-sealing fluid coupling as specified in claim 3 wherein a plug is slidably mounted within said tubular piston valve, a plug stop is carried by said tubular piston valve, a plug spring urges said plug toward abutment against said plug stop, and said plug stop is located to hold said plug within said tubular piston valve.

8. A separable self-sealing fluid coupling as specified in claim 3 wherein a tubular sealing member is slidably mounted on said sleeve valve, a tubular sealing member stop is carried by said sleeve valve, a tubular sealing member spring urges said tubular sealing member toward abutment against said tubular sealing member stop, and said tubular sealing member stop is located to hold said tubular sealing member entirely inwardly from the closed end of said body.

9. A separable self-sealing fluid coupling as specified in claim 7 wherein sealing means are provided on opposite sides of said tubular piston valve port between said tubular piston valve and said plug when said plug abuts against said plug stop.

10. A separable self-sealing fluid coupling as specified in claim 7 wherein said plug spring is of lesser strength than said tubular piston valve spring and of lesser strength than said sleeve valve spring.

11. A separable self-sealing fluid coupling as specified in claim 8 wherein sealing means are provided on opposite sides of said sleeve valve port between said sleeve valve and said tubular sealing member when said tubular sealing member abuts against said tubular sealing member stop.

12. A separable self-sealing fluid coupling as specified in claim 8 wherein said tubular sealing member spring is of lesser strength than said tubular piston valve spring and of lesser strength than said sleeve valve spring.

References Cited in the file of this patent
UNITED STATES PATENTS

| | | |
|---|---|---|
| 2,069,364 | Gussick | Feb. 2, 1937 |
| 2,347,351 | Laing | Apr. 25, 1944 |
| 2,393,679 | Gunderson | Jan. 29, 1946 |
| 2,471,237 | Pasturczak | May 24, 1949 |
| 2,545,796 | Scheiwer | Mar. 20, 1951 |
| 2,553,680 | Scheiwer | May 22, 1951 |